(12) United States Patent
Xiang et al.

(10) Patent No.: US 9,247,489 B2
(45) Date of Patent: Jan. 26, 2016

(54) SYSTEM AND METHOD FOR ANDSF ENHANCEMENT WITH ANQP SERVER CAPABILITY (71) Applicant: FutureWei Technologies, Inc., Plano, TX (US)

(72) Inventors: Zhixian Xiang, Plano, TX (US); Kaippallimalil Mathew John, Richardson, TX (US); Hinghung Anthony Chan, Plano, TX (US); Khosrow Tony Saboorian, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 166 days.

(21) Appl. No.: 13/861,905

(22) Filed: Apr. 12, 2013

(65) Prior Publication Data
US 2013/0272287 A1 Oct. 17, 2013

Related U.S. Application Data (60) Provisional application No. 61/624,069, filed on Apr. 13, 2012.

(51) Int. Cl.
H04B 7/00 (2006.01)
H04W 48/16 (2009.01)
H04W 48/14 (2009.01)

(52) U.S. Cl.
CPC .............. *H04W 48/16* (2013.01); *H04W 48/14* (2013.01)

(58) Field of Classification Search
CPC .... H04W 76/02; H04W 76/021; H04W 76/04
USPC .......................... 370/310–312, 328, 349, 464; 709/227–229, 249
See application file for complete search history.

(56) References Cited

U.S. PATENT DOCUMENTS

| 8,750,180 | B2 * | 6/2014 | McCann et al. ............... 370/310 |
| 2011/0280180 | A1 | 11/2011 | McCann et al. | |
| 2012/0182970 | A1 | 7/2012 | Ding et al. | |

(Continued)

FOREIGN PATENT DOCUMENTS

| CN | 101720109 A | 6/2010 |
| CN | 101730067 A | 6/2010 |

(Continued)

OTHER PUBLICATIONS

3GPP TS 24.312 V10.3.0 ANDSF Management Object, 3GPP, Jun. 2011, pp. 1-155.*

(Continued)

*Primary Examiner* — Dmitry H Levitan
(74) *Attorney, Agent, or Firm* — Slater & Matsil, L.L.P.

(57) ABSTRACT

System and method embodiments are provided for extending Access Network Discovery and Selection Function (ANDSF) with Access Network Query Protocol (ANQP) server capability. An embodiment method for network discovery and selection (NDS) includes receiving, at an ANQP proxy, query for network discovery information from a user equipment (UE), forwarding the query to an ANDSF including an indication for a service provider associated with a domain of users, receiving information associated with the service provider from the ANDSF, and forwarding the information associated with the service provider to the UE.

22 Claims, 5 Drawing Sheets

(56) References Cited

U.S. PATENT DOCUMENTS

| | | | |
|---|---|---|---|
| 2012/0324100 A1* | 12/2012 | Tomici et al. | 709/224 |
| 2013/0012260 A1* | 1/2013 | Salkintzis et al. | 455/550.1 |
| 2013/0265985 A1* | 10/2013 | Salkintzis | 370/331 |
| 2014/0247807 A1* | 9/2014 | Westerberg et al. | 370/331 |

FOREIGN PATENT DOCUMENTS

| | | |
|---|---|---|
| CN | 101730172 A | 6/2010 |
| WO | 2011035688 A1 | 3/2011 |

OTHER PUBLICATIONS

"3$^{rd}$ Generation Partnership Project; Technical Specification Group Core Network and Terminals; Access Network Discovery and Selection Function (ANDSF) Management Object (MO) (Release 12)," 3GPP TS 24.312, V12.0.0, Mar. 2013, 173 pages.

"3$^{rd}$ Generation Partnership Project; Technical Specification Group Core Network and Terminals; Access to the 3GPP Evolved Packet Core (EPC) via non-3GPP access networks; Stage 3 (Release 11)," 3GPP TS 24.302, V11.6.0, Mar. 2013, 61 pages.

"3$^{rd}$ Generation Partnership Project; Technical Specification Group Services and System Aspects; Architecture enhancements for non-3GPP accesses (Release 12)," 3GPP TS 23.402, V12.0.0, Mar. 2013, 253 pages.

China Mobile, "Solution for policy coordination," SA WG2 Meeting #93, S2-123539, Oct. 8-12, 2012, pp. 1-2.

IEEE, "IEEE Standard for Information technology—Telecommunications and information exchange between systems—Local and metropolitan area networks—Specific requirements, Part 11: Wireless LAN Medium Access Control (MAC) and Physical Layer (PHY) Specifications, Amendment 9: Interworking with External Networks," IEEE Std. IEEE Std. 802.11u™—2011, Feb. 25, 2011, 208 pages.

International Search Report and Written Opinion received in International Application No. PCT/CN2013/074211 mailed Aug. 1, 2013, 10 pages.

Chan, H. Anthony, et al., "TGc_Proposal_Hyunho_Park," IEEE 802.21 Media Independent Handover Services, Mar. 13, 2012, 71 pages.

Supplementary European Search Report received in Application No. EP 13 77 5338, mailed Mar. 3, 2015, 9 pages.

Intel, Cisco, "Solution for Trusted WLAN Access to EPC," 3GPP TSG SA WG2 Meeting #86, TD S2-1131481, Naantali, Finland, Jul. 5, 2011, 7 pages.

"3rd Generation Partnership Project; Technical Specification Group Services and System Aspects; Architecture enhancements for non-3GPP accesses (Release 11)," 3GPP TS 23.402, V11.2.0, Mar. 2012, 251 pages.

"3rd Generation Partnership Project; Technical Specification Group Core Network and Terminals; Access to the 3GPP Evolved Packet Core (EPC) via non-3GPP access networks; Stage 3 (Release 11)," 3GPP TS 24.302, V11.2.0, Mar. 2012, 59 pages.

IEEE, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications, Amendment 9: Interworking with External Networks, IEEE Std 802.11u, Feb. 25, 2011, 208 pages.

\* cited by examiner

SYSTEM AND METHOD FOR ANDSF ENHANCEMENT WITH ANQP SERVER CAPABILITY

This application claims the benefit of U.S. Provisional Application No. 61/624,069 filed on Apr. 13, 2012 by Amanda Xiang et al. and entitled "System and Method for Access Network Discovery and Selection," which is hereby incorporated herein by reference as if reproduced in its entirety.

TECHNICAL FIELD

The present invention relates to the field of wireless communications, and, in particular embodiments, to a system and method for Access Network Discovery and Selection Function (ANDSF) enhancement with Access Network Query Protocol (ANQP) server capability.

BACKGROUND

WiFi is becoming an important component for cellular operators to help them meet market demand and increase their competitive edge. Cellular operators are motivated to integrate WiFi access into their existing cellular networks, and many available mobile devices have dual mode (WiFi and cellular) capability. The WiFi Alliance is defining a Hotspot 2.0 specification to help dual mode or WiFi-only devices to better select the correct WiFi network that is owned by the operator to which it is subscribed or has a roaming relationship. This network selection technology is based on Institute of Electrical and Electronics Engineers (IEEE) 802.11u standard. The 3rd Generation Partnership Project (3GPP) also defines several mechanisms for a mobile device to determine and select a wireless local area network (WLAN) via policies that may be statically pre-configured by the operator on the device, also referred to as user equipment (UE). Such policies may also be dynamically set by the operator via the Access Network Discovery and Selection Function (ANDSF) within the network.

When a user chooses to connect to a WiFi network, the user device uses IEEE 802.11u Access Network Query Protocol (ANQP) to discover different features and available services of the WiFi network. The device then proceeds to the authentication process. To connect to a cellular network, a UE interacts with an ANDSF in the network, e.g., through the WiFi network, to get a network selection policy from the cellular network. Currently the ANQP server and ANDSF are two independent entities, although they are related to each other since ANDSF configures the UE WiFi network selection policy, and the UE uses the policy to query (e.g., using ANQP) the right information in the WiFi network. While WiFi access is being further integrated into cellular networks, there is benefit to integrate the ANQP server into ANDSF as they are both policy servers for network selection, e.g., to simplify and speed up the network discovery process.

SUMMARY OF THE INVENTION

In accordance with an embodiment, a method for network discovery and selection (NDS) includes receiving, at an Access Network Query Protocol (ANQP) proxy, query for network discovery information from a user equipment (UE), forwarding the query to an Access Network Discovery and Selection Function (ANDSF) including an indication for a service provider associated with a domain of users, receiving information associated with the service provider from the ANDSF, and forwarding the information associated with the service provider to the UE.

In accordance with another embodiment, a method for NDS includes receiving, at an ANDSF, query for network discovery from an ANQP proxy on behalf of a user, wherein the query includes an indication for a preferred service provider associated with the UE, retrieving information for the preferred service provider, and forwarding the y information for the preferred service provider to the ANQP proxy.

In accordance with another embodiment, a method for NDS includes sending, at a user terminal to an ANQP proxy at a WLAN or WiFi AP, NDS query for network discovery with a service provider indication, and receiving, via the ANQP proxy at the WLAN or WiFi hotspot from an ANDSF of a service provider network, information corresponding to the service provider indication.

In accordance with another embodiment, an AP supporting NDS includes a realm management object (MO) cache configured to maintain realm based NDS information, and an ANQP proxy coupled to the realm MO cache and configured to forward query for network discovery from an ANQP client to an Access Network Discovery and Selection Function (ANDSF) and to forward policy information on a realm basis from the ANDSF to the ANQP client.

In accordance with another embodiment, a network component supporting NDS includes a realm MO database configured to maintain realm based NDS policy, and an ANDSF coupled to the realm MO database and configured to receive query for NDS from an ANQP proxy on behalf of a user, retrieve policy information for the query on a realm basis, and send the policy information to the ANQP proxy.

In accordance with yet another embodiment, a user terminal configured for NDS includes a processor and a computer readable storage medium storing programming for execution by the processor. The programming includes instructions to send NDS query for network discovery to an ANQP proxy at a WLAN or WiFi AP, and receive, via the ANQP proxy at the WLAN or WiFi hotspot, policy information for a realm associated with the user terminal from an ANDSF of a service provider network.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
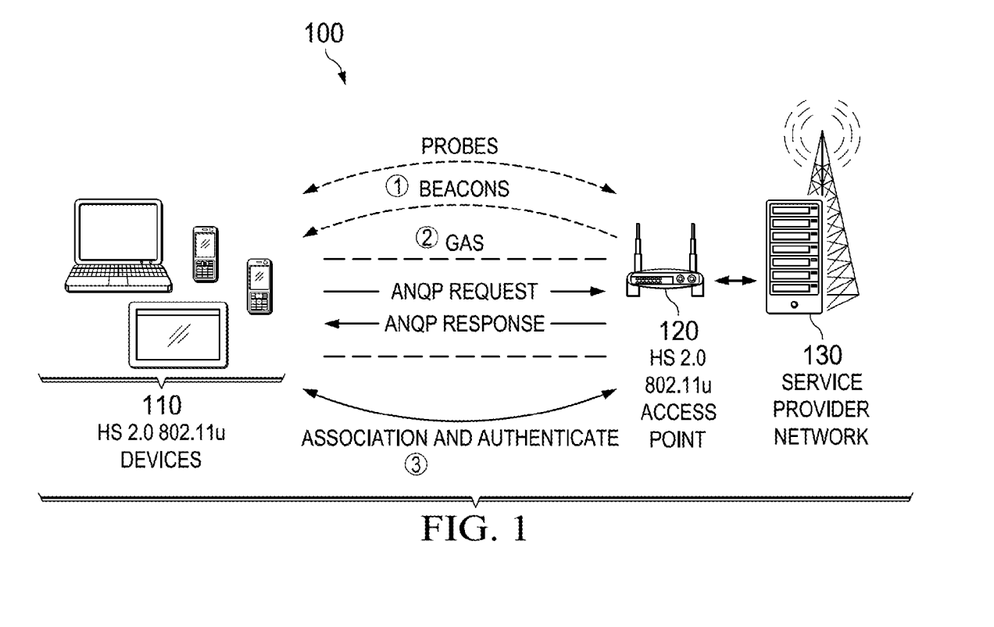
FIG. 1 illustrates IEEE 802.11U generic advertisement service and access network query protocol.

FIG. 1 illustrates a scheme 100 that uses an IEEE 802.11U generic advertisement service and access network query protocol. When user or client devices 110, such as computer desktops, laptops or tablets, smartphones, or other personal or mobile devices, choose to connect to a WiFi access, the devices 110 scan for available WiFi hotspots. For example, a device 110 discovers a hotspot 2.0 IEEE 802.11u access point (AP) 120 such as a router or modem to access a service provider network 130, e.g., a cellular network. The discovery process includes sending a probe message from the device 110 and receiving a beacon message from the AP 120. Prior to authentication of the device 110 by the network 130, an IEEE 802.11u Generic Advertisement Service (GAS) between a device 110 and an AP 120 is used to provide for Layer 2 transport of advertisement protocol frames between the device 110 and a server (not shown) in the network 130. An IEEE 802.11u Access Network Query Protocol (ANQP) is also used between the device 110 and the AP 120 to discover different features and available services of the network 130. The device 110 then proceeds to the authentication and association process to start a communications session with the network 130 via the WiFi AP 120.

Figure 2:
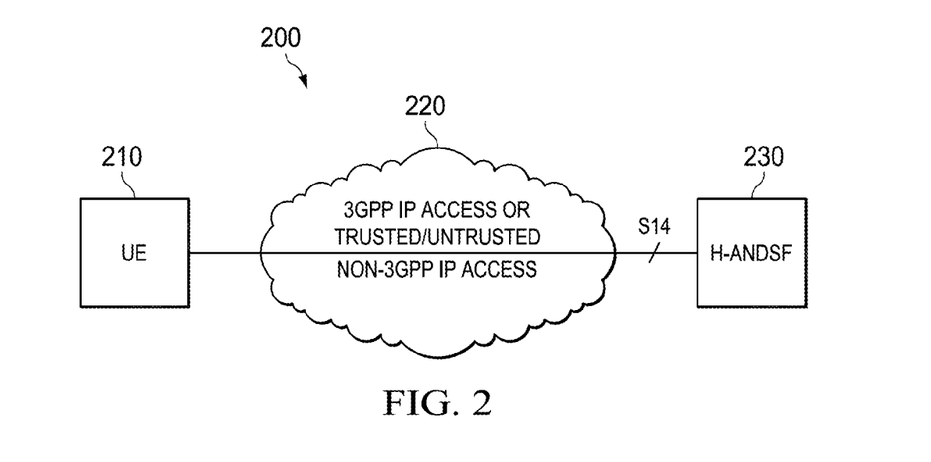
FIG. 2 illustrates a current scheme for a UE to obtain a network selection policy from an ANDSF.

FIG. 2 illustrates a scheme 200 where a UE 210 uses an ANDSF to obtain a network selection policy. After authentication, the UE 210 interacts with an ANDSF 230 through an S14 interface, which is IP level signaling to get a network selection policy from a network (not shown), e.g., a cellular network. The UE 210 can communicate with the ANDSF 230 via the S14 interface over 3GPP IP access technology 220 or alternatively a trusted or untrusted non-3GPP IP access technology 220, such as WiFi access. There are two ways for the policy to be populated to the UE 210: using a push mode (ANDSF 230 pushes policy to UE 210) or using a pull mode (UE 210 requests policy from ANDSF 230). The information provided by the ANDSF 230 to the UE 210 to assist with access network selection includes inter-system routing policy. The inter-system routing policy comprises validity conditions, e.g., conditions indicating when the provided policy is valid. The policy also comprises one or more filter rules, each one identifying a prioritized list of access technologies/networks that can be used by the UE 210 when available to route traffic that matches IP filters on a specific AP name (APN) or on any APN. A filter rule also identifies which radio access technologies are restricted for traffic that matches IP filters on a specific APN (e.g., a WLAN is not allowed for Real-time Transport Protocol (RTP)/RTP Control Protocol (RTCP) traffic flows on APN-x) or on any APN.

Currently, as described in schemes 100 and 200, the ANDSF provides policy to the terminal/user after authenticating the terminal/user, while ANQP query can be used for unauthorized user (e.g., prior to user authentication). Thus, current ANDSF capability does not support ANQP query. Additionally, current ANDSF policy query and response is per user basis. However, the ANDSF cannot give an individual user the policy information for ANQP query because the user has not been authenticated yet.

System and method embodiments are provided for extending ANDSF with ANQP server capability. The embodiments include network discovery and selection (NDS) architectures capable of providing policies (e.g., for alternative network discovery information) on a realm specific basis prior to user authentication. A realm may designate a network operator, a class of subscribers, or any other class or group of users. This complements existing WLAN NDS ANQP mechanisms that provide information before authentication. A realm indicator part of a network access identifier (NAI) in NDS queries can be used, for instance over an enhanced S14 protocol, to indicate that the query is for a realm (e.g., where there is no need to authenticate the user). Alternatively, a flag may be set, e.g., in an enhanced S14 protocol, to indicate that the query is on a realm specific basis.

The realm specific policies (e.g., for network discovery) may be categorized into various subscriber classes such as gold, silver, etc., or some other operator classification. An embodiment, described below, provides an enhanced NDS architecture capable of relaying ANQP over an IP network to an ANDSF server. Another embodiment, also described below, provides an enhanced NDS architecture capable of translating between ANQP and ANDSF management object (MO)/information formats. A third NDS architecture embodiments convey ANQP information to ANDSF from unauthenticated (or authenticated) users by relaying ANQP over a suitable IP transport and translating between ANQP and ANDSF formats. The NDS architecture embodiments also include an ANDSF server configured to provide realm specific policies prior to authenticating a user (e.g., in addition to the existing user-specific policies). The realm specific policies can be cached in an AP/access control (AC) of a WLAN to access a 3GPP or cellular network. The user equipment/terminals in the embodiments support the enhanced ANQP/ANDSF schemes with realm specific policies prior to authentication. The embodiments above can be implemented in the 3GPP SA2 specification 23.402, 24.302, WiFi Alliance Hotspot 2.0, and IEEE 802.11u extension, and may be applied to WiFi APs, ANDSFs, WiFi-cellular dual mode terminals, terminals with hotspot 2.0 support, WiFi Access Point/Access controllers, ANDSF servers, and the like.

Figure 3:
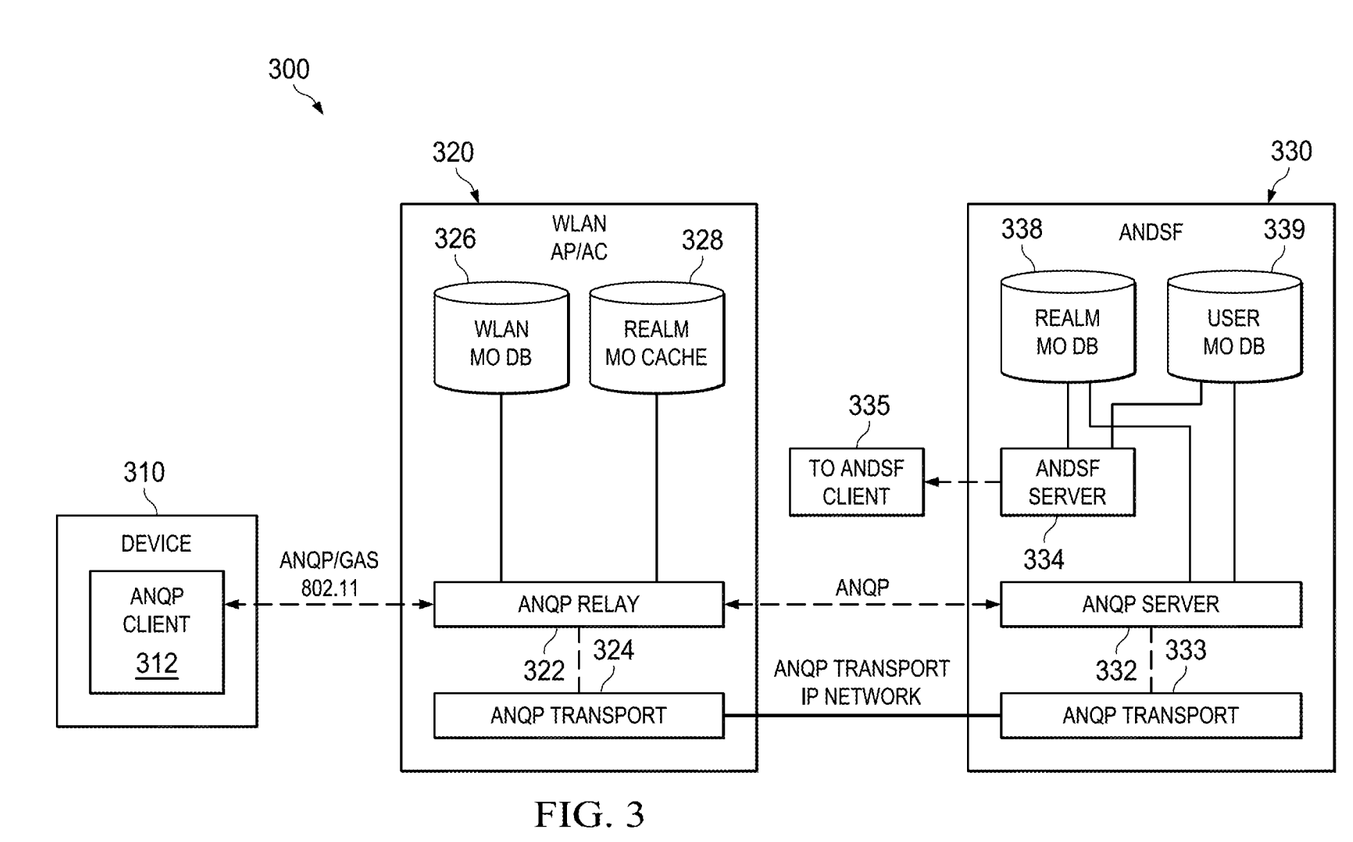
FIG. 3 illustrates an embodiment of an ANQP relay architecture.

FIG. 3 illustrates an embodiment of a NDS architecture 300 with ANQP relay. The architecture 300 includes a UE or user device 310, an AP/AC 320 (e.g. a WLAN AP/AC), and an ANDSF 330. The AP/AC 320 may be located at a WLAN or other WiFi network and the ANDSF 330 may be at a service provider network, e.g., cellular or 3GPP network. The device 310 includes an ANQP client 312 configured (e.g., via software) to communicate with an ANQP relay 322 at the AP/AC 320, which in turn communicates with an ANQP server 332 at the ANDSF 330. The ANQP relay 322 sends ANQP query from the ANQP client 312 (at the device 310) to the ANQP server 332 (at the 3GPP network). The AP/AC 320, e.g., in a WLAN or IEEE 802.11 (WiFi) network, also includes an ANQP transport block 324 that forwards ANQP/GAS frames over an IP network for ANQP transport. The IP network for ANQP transport enables the carrying of policies that are realm specific from the ANQP server 332 via another ANQP transport block 333 in the ANDSF 330.

The ANDSF 330 comprises a realm MO database (DB) 338 that comprises network selection policies on a realm-specific basis, and a user MO DB 339 that comprises network selection policies on a user-specific basis. The ANDSF 330 also includes an ANDSF server 334 that communicates with an ANDSF client 335 (e.g., for a UE) to provide network selection policies on a user-specific basis. The DBs 338 and 339 are accessible by the ANDSF server 334 and the ANQP server 332. In addition to a WLAN MO DB 326, the AP/AC 320 can also maintain a realm MO cache 328 that includes the policies of the realm MO DB 338. The DBs 326 and 328 are accessible by the ANQP relay 322.

Figure 4:
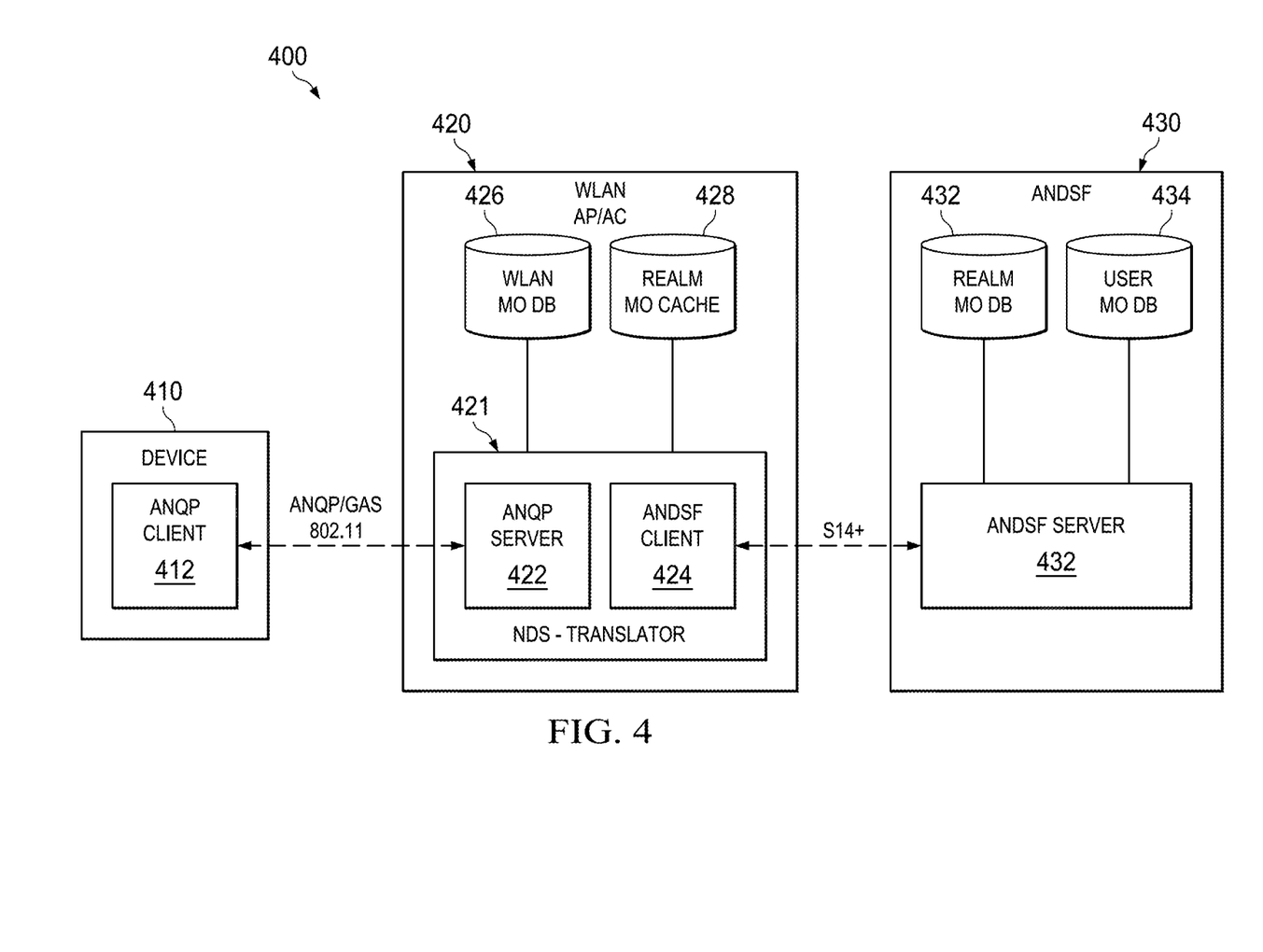
FIG. 4 illustrates an embodiment of an ANQP translation architecture.

FIG. 4 illustrates an embodiment of a NDS architecture 400 with ANQP translation. The architecture 400 includes a UE or user device 410, an AP/AC 420 (e.g. a WLAN AP/AC), and an ANDSF 430. The AP/AC 420 may be located at a WLAN or other WiFi network and the ANDSF 430 may be at a service provider network, e.g., cellular or 3GPP network. The device 410 includes an ANQP client 412 configured (e.g., via software) to communicate with a NDS translator 421 at the AP/AC 420, which in turn communicates with an ANDS server 432 at the ANDSF 430. The NDS translator 421 translates queries and policies between ANQP and ANDSF. The NDS translator 421 includes an ANQP server 422 that communicates with the ANQP client 412 and an ANDSF client 421 that communicates with the ANDSF server 432. As such, the NDS translator 421 terminates ANQP/GAS frames in the WLAN (or IEEE 802.11) network and translate the ANQP query to an enhanced or extended S14 (referred to herein as S14+) and hence to the ANDSF server 432.

The ANDSF 430 comprises a realm MO DB 434 that comprises network selection policies on a realm-specific basis, and a user MO DB 436 that comprises network selection policies on a user-specific basis. The DBs 434 and 436 are accessible by the ANDSF server 432. The S14+ enables the carrying of policies that are realm specific from the ANDSF server 432. In addition to a WLAN MO DB 426, the AP/AC 420 can also maintain a realm MO cache 428 that includes the policies of the realm MO DB 434. The DBs 426 and 428 are accessible by the NDS translator 421.

Figure 5:
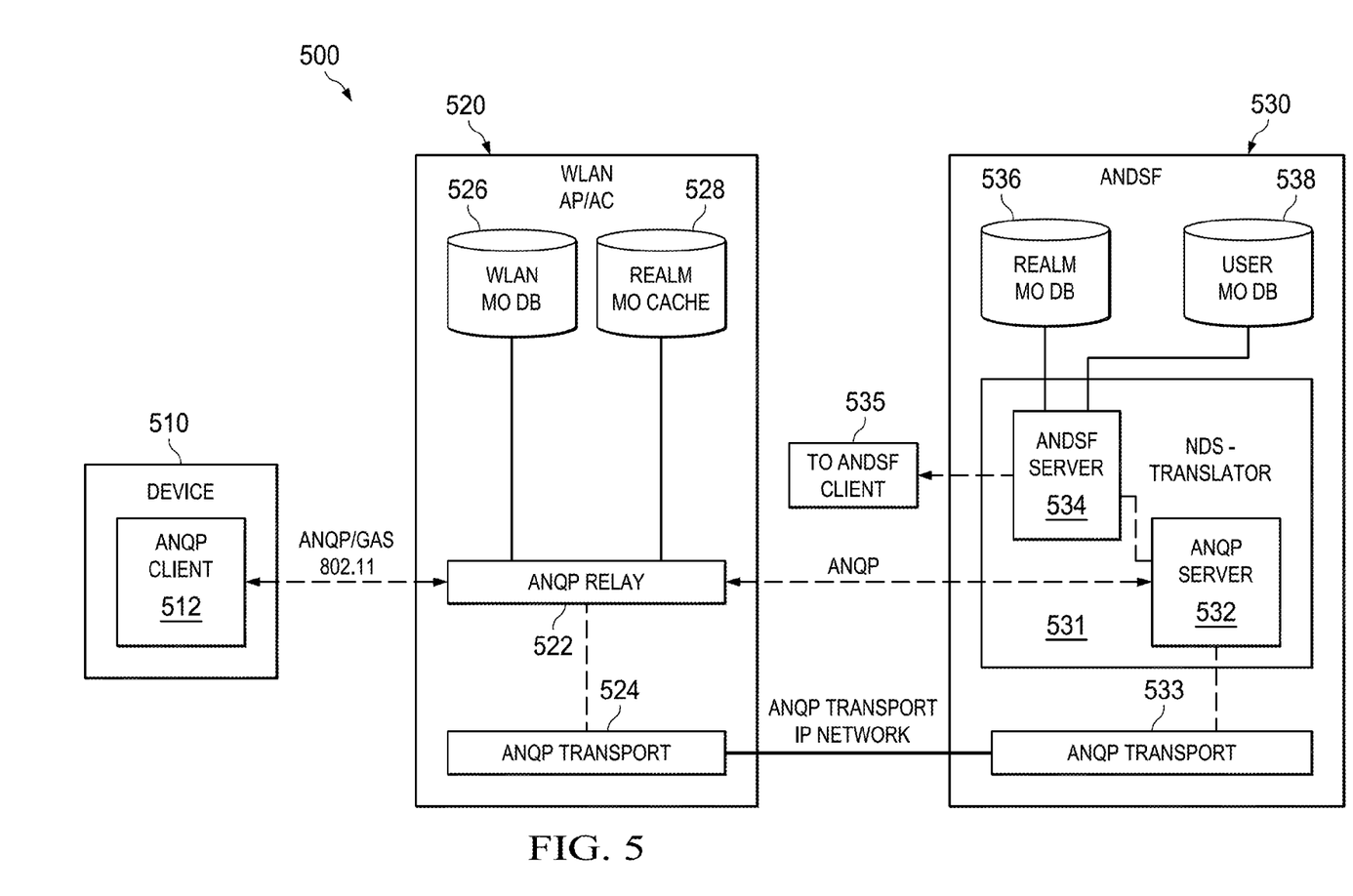
FIG. 5 illustrates an embodiment of an ANQP relay/translation architecture.

FIG. 5 illustrates an embodiment of a NDS architecture 500 with ANQP relay/translation. The architecture 500 includes a UE or user device 510, an access point/access controller (AP/AC) 520 (e.g. a WLAN AP/AC), and an ANDSF 530. The AP/AC 520 may be located at a WLAN or other WiFi network and the ANDSF 530 may be at a service provider network, e.g., cellular or 3GPP network. The device 510 includes an ANQP client 512 configured (e.g., via software) to communicate with an ANQP relay 522 at the AP/AC 520, which in turn communicates with an ANQP server 532 in a NDS translator 531 at the ANDSF 530. The NDS translator 431 translates queries and policies between ANQP and ANDSF. The ANQP relay 522 sends ANQP query from the ANQP client 512 (at the device 510) to the ANQP server 532 of the NDS translator 531. The NDS translator 531 also includes an ANDSF server 534 that communicates with the ANQP server 532 to provide realm specific policies.

The ANDSF 430 comprises a realm MO DB 536 that comprises network selection policies on a realm-specific basis, and a user MO DB 538 that comprises network selection policies on a user-specific basis. The DBs 536 and 538 are accessible by the ANDSF server 432. The AP/AC 520, e.g., in a WLAN or IEEE 802.11 (WiFi) network, also includes an ANQP transport block 524 that forwards ANQP/GAS frames over an IP network for ANQP transport. The ANQP transport enables the carrying of policies that are realm specific from the ANQP server 532 via another ANQP transport block 533 in the ANDSF 530. In addition to a WLAN MO DB 526, the AP/AC 520 can also maintain a realm MO cache 528 that includes the policies of the realm MO DB 536. The DBs 526 and 528 are accessible by the ANQP relay 522.

Figure 6:
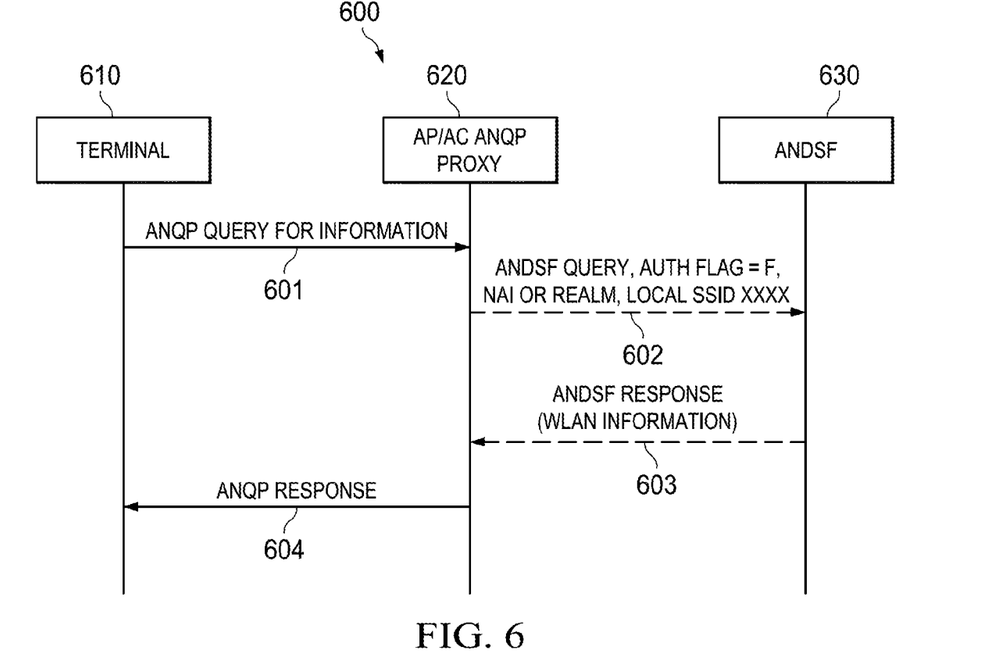
FIG. 6 illustrates an embodiment of a pre-authentication method for ANQP/ANDSF query and policy exchange.

FIG. 6 is a flow diagram of an embodiment of a pre-authentication method 600 for ANQP/ANDSF query and policy exchange. At step 601, a terminal 610 (e.g., UE or user device) send an ANQP query for information before being authenticated by a network. The ANQP query is sent an ANQP proxy 620, e.g., within an AP/AC. For example, the ANQP proxy 620 is the ANQP 322 in the architecture 300, the NDS translator 421 in the architecture 400, or the ANQP relay 522 in the architecture 500. At step 602, the ANQP proxy 620 sends an ANDSF query to an ANDSF 630 (in a 3GPP network). The ANDSF query includes a realm or NAI to indicate a preferred service provider for the terminal 610. The query can also include an authentication flag that is set to fault to indicate user or terminal is not yet authenticated. The query can also include a service set identifier (SSID) of the operator that owns the AP/AC (the WiFi service operator). At step 603, if the authentication flag in the ANDSF query is set to fault, then the ANDSF 630 considers the query as unauthorized ANQP query and responds to the ANQP proxy 620 with general information. The information may include policy related to that SSID (realm specific information), such as WLAN information. At step 604, the ANQP proxy 620 responds to the terminal 610 with the information and policy from the ANDSF 630.

Figure 7:
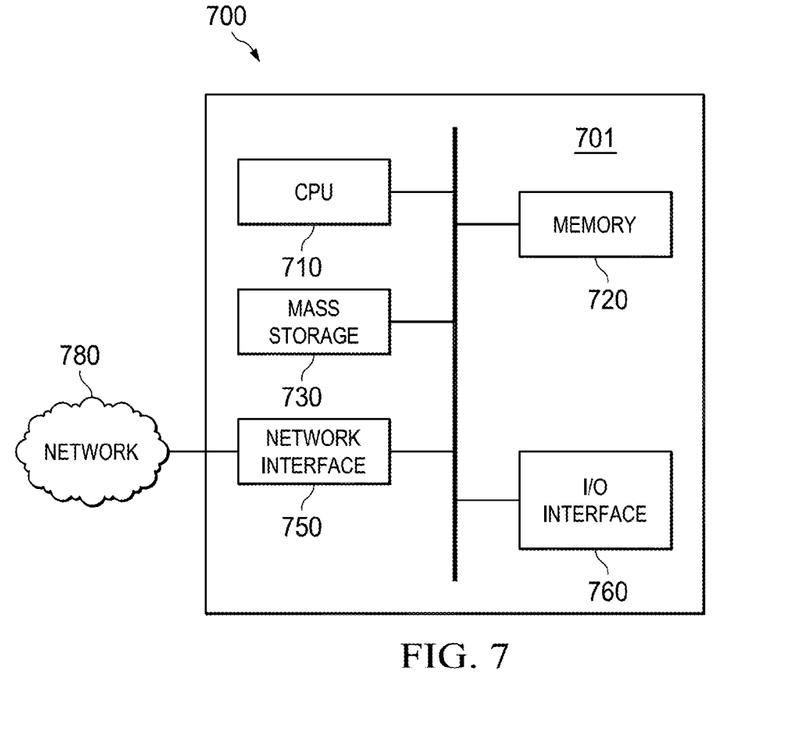
FIG. 7 is a diagram of a processing system that can be used to implement various embodiments.

FIG. 7 is a block diagram of a processing system 700 that can be used to implement various embodiments. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 700 may comprise a processing unit 701 equipped with one or more input/output devices, such as a network interfaces, storage interfaces, and the like. The processing unit 701 may include a central processing unit (CPU) 710, a memory 720, a mass storage device 730, and an I/O interface 760 connected to a bus. The bus may be one or more of any type of several bus architectures including a memory bus or memory controller, a peripheral bus or the like.

The CPU 710 may comprise any type of electronic data processor. The memory 720 may comprise any type of system memory such as static random access memory (SRAM), dynamic random access memory (DRAM), synchronous DRAM (SDRAM), read-only memory (ROM), a combination thereof, or the like. In an embodiment, the memory 720 may include ROM for use at boot-up, and DRAM for program and data storage for use while executing programs. In embodiments, the memory 720 is non-transitory. The mass storage device 730 may comprise any type of storage device configured to store data, programs, and other information and to make the data, programs, and other information accessible via the bus. The mass storage device 730 may comprise, for example, one or more of a solid state drive, hard disk drive, a magnetic disk drive, an optical disk drive, or the like.

The processing unit 701 also includes one or more network interfaces 750, which may comprise wired links, such as an Ethernet cable or the like, and/or wireless links to access nodes or one or more networks 780. The network interface 750 allows the processing unit 701 to communicate with remote units via the networks 780. For example, the network interface 750 may provide wireless communication via one or more transmitters/transmit antennas and one or more receivers/receive antennas. In an embodiment, the processing unit 701 is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for network discovery and selection (NDS), the method comprising:

receiving, at an Access Network Query Protocol (ANQP) proxy from a user equipment (UE), a query for network discovery information, the query including an indication for a service provider associated with a domain of users;

forwarding the query, including the indication for the service provider, from the ANQP proxy to an Access Network Discovery and Selection Function (ANDSF);

receiving, at the ANQP proxy from the ANDSF, information associated with the service provider and retrieved by the ANDSF in response to the query from the ANQP proxy;

forwarding, by the ANQP proxy to the UE, the information associated with the service provider indicated by the UE;

communicating, by the ANQP proxy, ANQP or Generic Advertisement Service (GAS) frames with an ANQP server of the ANDSF; and exchanging, by the ANQP proxy, query and policy information on a realm basis with an ANQP transport block of the ANDSF via an Internet Protocol (IP) network for ANQP transport.

2. The method of claim 1, wherein the query is received from the UE prior to authenticating the UE or a user of the UE.

3. The method of claim 1 further comprising setting a flag in the query forwarded to the ANDSF to indicate that the UE or a user of the UE is not authenticated.

4. The method of claim 1, wherein the received and forwarded information includes network information, network policy that instructs UE behavior on network selection or other interaction with a network, or both network information and network policy.

5. The method of claim 1, wherein the indication is an identifier for a service provider that the UE is subscribed to or that is preferred for the UE, an identifier for a realm associated with the UE, an access point name (APN), or another group or domain identifier.

6. The method of claim 1, wherein the received and forwarded information includes service provider specific policies that are categorized into various subscriber classes or operator classifications.

7. The method of claim 1, wherein the query includes a network access identifier (NAI) associated with a preferred service provider for the UE.

8. The method of claim 1, wherein a flag is set in the query to indicate that the query is on a service provider specific basis.

9. The method of claim 1, wherein a flag is set in the query to indicate that the query is for network information or operator policy.

10. The method of claim 1, wherein the ANQP proxy receives the query at a wireless local area access network (WLAN) or a WiFi hotspot and adds to the query a service set identifier (SSID) corresponding to an operator of the WLAN or the WiFi hotspot.

11. The method of claim 10 further comprising caching, at the WLAN or WiFi hotspot, operator or local network specific policies and information.

12. A method for network discovery and selection (NDS), the method comprising:

receiving, at an Access Network Discovery and Selection Function (ANDSF) from an Access Network Query Protocol (ANQP) proxy on behalf of a user equipment (UE), a query for network discovery, wherein the query includes an indication for a preferred service provider associated with the UE;

retrieving, at the ANDSF, information for the preferred service provider in response to the query from the ANQP proxy;

forwarding the information for the preferred service provider indicated by the UE from the ANDSF to the ANQP proxy;

communicating with an ANQP relay of the ANQP proxy; and exchanging query and policy information on a realm basis with an ANQP transport block of the ANQP proxy via an Internet Protocol (IP) network for ANQP transport.

13. The method of claim 12, wherein the ANDSF is implemented by a cellular network component, and wherein the ANQP proxy is located at a wireless local area access network (WLAN) or a WiFi hotspot.

14. The method of claim 13 further comprising caching, at the cellular network component and the WLAN or WiFi hotspot, realm specific policies in a realm management object (MO) database.

15. The method of claim 14 further comprising matching the information to the preferred service provider associated with the UE in the MO database using a service provider identifier or a network access identifier (NAI) in the query.

16. The method of claim 13 further comprising matching the information to an operator of the WLAN or WiFi hotspot using a service set identifier (SSID) in the query.

17. The method of claim 12 further comprising detecting a flag in the query received from the ANQP proxy to determine that the UE is not authenticated.

18. An access point (AP) supporting network discovery and selection (NDS), the AP comprising:

a realm management object (MO) cache configured to maintain realm based NDS information;

at least one processor coupled to the realm MO cache; and a non-transitory computer readable storage medium storing programming for execution by the at least one processor, the programming including instructions to:

execute an Access Network Query Protocol (ANQP) proxy that forwards a query for network discovery from an ANQP client to an Access Network Discovery and Selection Function (ANDSF) serving entity and forwards policy information on a realm basis from the ANDSF serving entity to the ANQP client, wherein the query from the ANQP client includes an indication for a service provider associated with a domain of users, and wherein the policy information retrieved by the ANDSF serving entity in response to the query from the ANQP proxy corresponds to the service provider indicated by the ANQP client, wherein the instructions to execute the ANQP proxy include instructions to execute an ANQP relay that communicates with the ANQP client to exchange ANQP or Generic Advertisement Service (GAS) frames and communicates with an ANQP server of the ANDSF serving entity, and to execute an ANQP transport block that exchanges the query and the policy information on a realm basis with another ANQP transport block of the ANDSF serving entity via an Internet Protocol (IP) network for ANQP transport.

19. An access point (AP) supporting network discovery and selection (NDS), the AP comprising:

a realm management object (MO) cache configured to maintain realm based NDS information;

at least one processor coupled to the realm MO cache; and a non-transitory computer readable storage medium storing programming for execution by the at least one processor, the programming including instructions to:

execute an Access Network Query Protocol (ANQP) proxy that forwards a query for network discovery from an ANQP client to an Access Network Discovery and Selection Function (ANDSF) serving entity and forwards policy information on a realm basis from the ANDSF serving entity to the ANQP client, wherein the query from the ANQP client includes an indication for a service provider associated with a domain of users, wherein the policy information retrieved by the ANDSF serving entity in response to the query from the ANQP proxy corresponds to the service provider indicated by the ANQP client, and wherein the instructions to execute the ANQP proxy include instructions to execute an ANQP server that communicates with the ANQP client to exchange ANQP or Generic Advertisement Service (GAS) frames, and to execute an ANDSF client that communicates with the ANQP server and exchanges the query and the policy information on a realm basis with the ANDSF via an extended S14 interface that enables carrying realm specific policies.

20. A network component supporting network discovery and selection (NDS), the network component comprising:

a realm management object (MO) database configured to maintain realm based NDS policy;

at least one processor coupled to the realm MO database; and a non-transitory computer readable storage medium storing programming for execution by the at least one processor, the programming including instructions to:

execute an Access Network Discovery and Selection Function (ANDSF) that receives a query for NDS from an Access Network Query Protocol (ANQP) proxy serving device on behalf of a user equipment (UE), retrieves policy information for the query on a realm basis in response to the query from the ANQP proxy, and sends the policy information to the ANQP proxy serving device, wherein the query from the UE includes an indication for a service provider associated with a domain of users, wherein the policy information corresponds to the service provider indicated by the UE, and wherein the instructions to execute the ANDSF include instructions to execute an ANQP server that communicates with an ANQP relay of the ANQP proxy serving device, and to execute an ANQP transport block that exchanges the query and the policy information on a realm basis with another ANQP transport block of the ANQP proxy serving device via an Internet Protocol (IP) network for ANQP transport.

21. A network component supporting network discovery and selection (NDS), the network component comprising:

a realm management object (MO) database configured to maintain realm based NDS policy;

at least one processor coupled to the realm MO database; and a non-transitory computer readable storage medium storing programming for execution by the at least one processor, the programming including instructions to:

execute an Access Network Discovery and Selection Function (ANDSF) that receives a query for NDS from an Access Network Query Protocol (ANQP) proxy serving device on behalf of a user equipment (UE), retrieves policy information for the query on a realm basis in response to the query from the ANQP proxy, and sends the policy information to the ANQP proxy serving device, wherein the query from the UE includes an indication for a service provider associated with a domain of users, wherein the policy information corresponds to the service provider indicated by the UE, wherein the ANQP proxy serving device serves as a NDS translator comprising executing an ANQP server and an ANDSF client, and wherein the instructions to execute the ANDSF include instructions to communicate with the ANDSF client of the ANQP proxy serving device via an extended S14 interface that includes carrying service provider specific policies.

22. A network component supporting network discovery and selection (NDS), the network component comprising:

a realm management object (MO) database configured to maintain realm based NDS policy;

at least one processor coupled to the realm MO database; and a non-transitory computer readable storage medium storing programming for execution by the at least one processor, the programming including instructions to:

execute an Access Network Discovery and Selection Function (ANDSF) that receives a query for NDS from an Access Network Query Protocol (ANQP) proxy serving device on behalf of a user equipment (UE), retrieves policy information for the query on a realm basis in response to the query from the ANQP proxy, and sends the policy information to the ANQP proxy serving device, wherein the query from the UE includes an indication for a service provider associated with a domain of users, and wherein the policy information corresponds to the service provider indicated by the UE, wherein the instructions to execute the ANDSF include instructions to execute a NDS translator including executing an ANDSF server and an ANQP server that communicates with the ANDSF server, and to execute an ANQP transport block that exchanges the query and the policy information on a realm basis with another ANQP transport block of the ANQP proxy serving device via an Internet Protocol (IP) network for ANQP transport.

* * * * *